US007808422B1

(12) United States Patent
Woodell et al.

(10) Patent No.: US 7,808,422 B1
(45) Date of Patent: Oct. 5, 2010

(54) PREDICTIVE AND ADAPTIVE WEATHER RADAR DETECTION SYSTEM AND METHOD

(75) Inventors: Daniel L. Woodell, Cedar Rapids, IA (US); Roy E. Robertson, Marion, IA (US); Peter A. Olander, West Melbourne, FL (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 452 days.

(21) Appl. No.: 11/515,642

(22) Filed: Sep. 5, 2006

Related U.S. Application Data

(63) Continuation-in-part of application No. 11/256,845, filed on Oct. 24, 2005, now Pat. No. 7,598,902, which is a continuation of application No. 10/631,253, filed on Jul. 31, 2003, now Pat. No. 7,129,885.

(51) Int. Cl.
 *G01S 13/95* (2006.01)
 *G01S 7/285* (2006.01)
 *G01S 13/00* (2006.01)
 *G01S 7/02* (2006.01)

(52) U.S. Cl. .................... 342/26 B; 342/26 R; 342/89; 342/91; 342/159; 342/175; 342/195; 701/200; 701/207; 701/213

(58) Field of Classification Search ........ 342/26 R–26 D, 342/73–81, 89–103, 159–186, 192–197, 342/357.01–357.17; 701/200, 207, 213–216
See application file for complete search history.

(56) References Cited

U.S. PATENT DOCUMENTS

| 3,943,511 A | 3/1976 | Evans et al. |
|---|---|---|
| 3,968,490 A | 7/1976 | Gostin |
| 4,318,100 A | 3/1982 | Shimizu et al. |
| 4,430,654 A | 2/1984 | Küpfer |
| 4,459,592 A | 7/1984 | Long |
| 4,533,915 A | 8/1985 | Lucchi et al. |
| 4,555,703 A * | 11/1985 | Cantrell ............. 342/26 R |
| 4,658,255 A | 4/1987 | Nakamura et al. |
| 4,684,950 A | 8/1987 | Long |
| 4,742,353 A | 5/1988 | D'Addio et al. |
| 4,928,131 A | 5/1990 | Onozawa |
| 5,177,487 A * | 1/1993 | Taylor et al. ............. 342/159 |
| 5,296,865 A | 3/1994 | Lewis |
| 5,469,168 A * | 11/1995 | Anderson ............. 342/26 D |
| 5,485,157 A | 1/1996 | Long |
| 5,648,782 A * | 7/1997 | Albo et al. ............. 342/26 D |
| 5,686,919 A * | 11/1997 | Jordan et al. ............. 342/26 D |
| 5,973,635 A * | 10/1999 | Albo ............. 342/26 D |
| 6,297,772 B1 | 10/2001 | Lewis |

(Continued)

*Primary Examiner*—Bernarr E Gregory
(74) *Attorney, Agent, or Firm*—Matthew J. Evans; Daniel M. Barbieri

(57) ABSTRACT

A method of detecting weather on an aircraft uses a weather radar system. The method includes determining a location of a reflective radar target, accessing a database having stored information relating to ground clutter of a reflective radar target, retrieving weather radar information associated with the location, and automatically adjusting the weather radar return threshold in response to the information. The method can adjust a threshold for a weather radar display, adjust a weather radar signal gain, adjust a tilt angle of the weather radar, or adjust a ground clutter suppression threshold. The method can be implemented by hardware and/or software.

20 Claims, 6 Drawing Sheets

U.S. PATENT DOCUMENTS

| | | | |
|---|---|---|---|
| 6,424,288 B1 * | 7/2002 | Woodell | 342/26 R |
| 6,518,914 B1 | 2/2003 | Peterson et al. | |
| 6,603,425 B1 * | 8/2003 | Woodell | 342/26 R |
| 6,677,886 B1 * | 1/2004 | Lok | 342/26 R |
| 6,690,317 B2 | 2/2004 | Szeto et al. | |
| 6,771,207 B1 * | 8/2004 | Lang | 342/26 R |
| 7,030,805 B2 | 4/2006 | Ormesher et al. | |
| 7,145,503 B2 * | 12/2006 | Abramovich et al. | 342/159 |

* cited by examiner

PREDICTIVE AND ADAPTIVE WEATHER RADAR DETECTION SYSTEM AND METHOD

CROSS-REFERENCE TO RELATED APPLICATIONS

This application is a continuation-in-part of and claims priority to U.S. patent application Ser. No. 11/256,845, filed Oct. 25, 2005, now U.S. Pat. No. 7,598,902, which is a continuation of U.S. patent application Ser. No. 10/631,253, filed Jul. 31, 2003, now U.S. Pat. No. 7,129,885, both of which applications are herein incorporated by reference.

BACKGROUND

Conventionally, pilots use weather radar to detect and avoid hazardous weather. Conventional radar systems may produce the desired results only in a limited environment. Typically, airborne threshold systems use thresholds for wet precipitation derived from ground-based weather radar thresholds which were generated from convective weather detections. Such thresholds have been set in accordance with reflectivity data which is applicable to typical convective weather systems. It has been observed that for airborne applications ground clutter causes differences in reflectivity which may cause inaccurate weather indications. A feature of conventional radar systems is the ability to suppress display of returns from the ground in favor of returns from weather. These ground clutter suppression systems may have limited effectiveness with certain local geographical conditions, such as in the presence of cities, especially cities near bodies of water, and with tall objects, such as towers beyond the horizon. Such ground clutter may erroneously be presented as a weather target. Conventionally, weather radar ground clutter suppression systems may rely on different return signals resulting from radar beam sweeps occurring at different beam elevations. Even so, many geographical phenomena may not be suppressed using present ground clutter suppression systems.

Conventionally, radar thresholds map radar return strength to a display with color representing rain rate or alternatively a weather threat assessment level. The threat level has been previously described as primarily a function of radar reflectivity and a weaker function of temperature, altitude, and latitude. However, because of various geographical phenomena, the conventional mapping, while useful, does not completely allow successful operation of aircraft in difficult geographic situations. The higher reflectivity of these geographic phenomena produces erroneous detection of significant convective weather systems during flight. Further, because of the ability of aircraft flying over such geographical phenomena to circumnavigate storm systems, when believed to be present, it would therefore be desirable to provide an airborne radar system which has the ability to more accurately detect and report the existence and/or characteristics of storms when operating in various geographically diverse environments.

It may be possible for a pilot operating a radar manually to be able to compensate for the differences in geographical phenomena as each pilot becomes familiar with the environment. However, knowledge by the pilot must be acquired, and further, an increase in pilot workload is also necessitated. Therefore, there is a need for an automated system of adjusting radar thresholds based on the presence of a variety of geographical phenomena.

In addition, ground clutter reflectivity can vary by time of day and time of year, in various geographical regions. For example, dew forming on grass increases ground reflectivity. Ground reflectivity also may vary depending on whether forests are leaf covered or bare or whether fields are filled or fully vegetated. Similarly, snow covered landscapes reflect differently than green grasslands. Thus, it may be desirable to identify ground clutter in accordance with temporal information.

In addition, weather characteristics can change according to seasonal and time-of-day variations. For example, certain radar reflectivities occurring during the monsoon season may indicate hazardous weather while those same radar reflectivities would indicate non-hazardous weather during another season. Similarly, weather radar returns at a certain time-of-day are more likely to indicate the presence of hazardous weather (e.g., afternoon) while those same returns are less likely to indicate the presence of a hazard at another time-of-day (e.g., early morning). Accordingly, it would be desirable to provide a radar system which can compensate radar detection in accordance with both temporal and spatial information.

Accordingly, there is a need to adjust weather radar detection and ground clutter suppression schemes based upon a specific geographic location, time-of-day, and/or season (time-of-year). There is further a need to adjust weather radar systems by adjusting display thresholds, tilt angle, and/or system gain. Yet further, there is a need for a weather radar system that automatically adjusts to location time-of-day, and/or time-of-year. Yet further still, there is a need to adjust weather radar systems by adjusting thresholds and parameters based on known ground clutter locations.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a method of detecting weather on an aircraft using a weather radar system. The method includes determining a location of reflective radar targets, accessing a database having information relating to ground clutter of the reflective radar targets, retrieving weather radar information associated with the location and automatically adjusting the weather radar return thresholds in response to the information.

Another exemplary embodiment relates to a method of adapting an aircraft weather radar system. The method includes determining at least one of a time-of-year parameter, a time-of-day parameter, or a location parameter. The method also includes automatically adjusting the weather radar system radar return display thresholds to display weather in response to at least one of the time-of-year parameter, time-of-day parameter, or location parameter.

Still another exemplary embodiment relates to an airborne weather radar system carried on an aircraft. The airborne weather radar system includes a radar antenna system and a processing means for adjusting display thresholds of the weather radar system. The processing means adjusts performance of the weather radar system based on a location of known ground clutter targets.

Yet still another exemplary embodiment relates to a method of creating a weather radar display threshold database. The method comprises receiving, by a ground-based weather radar system, weather radar returns for a location.

The method also comprises receiving by an airborne based weather radar system weather radar returns over the location. Further, the method comprises determining a display threshold for the airborne based weather radar system which provides a substantial match of the ground-based weather radar returns and the airborne based weather radar returns.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
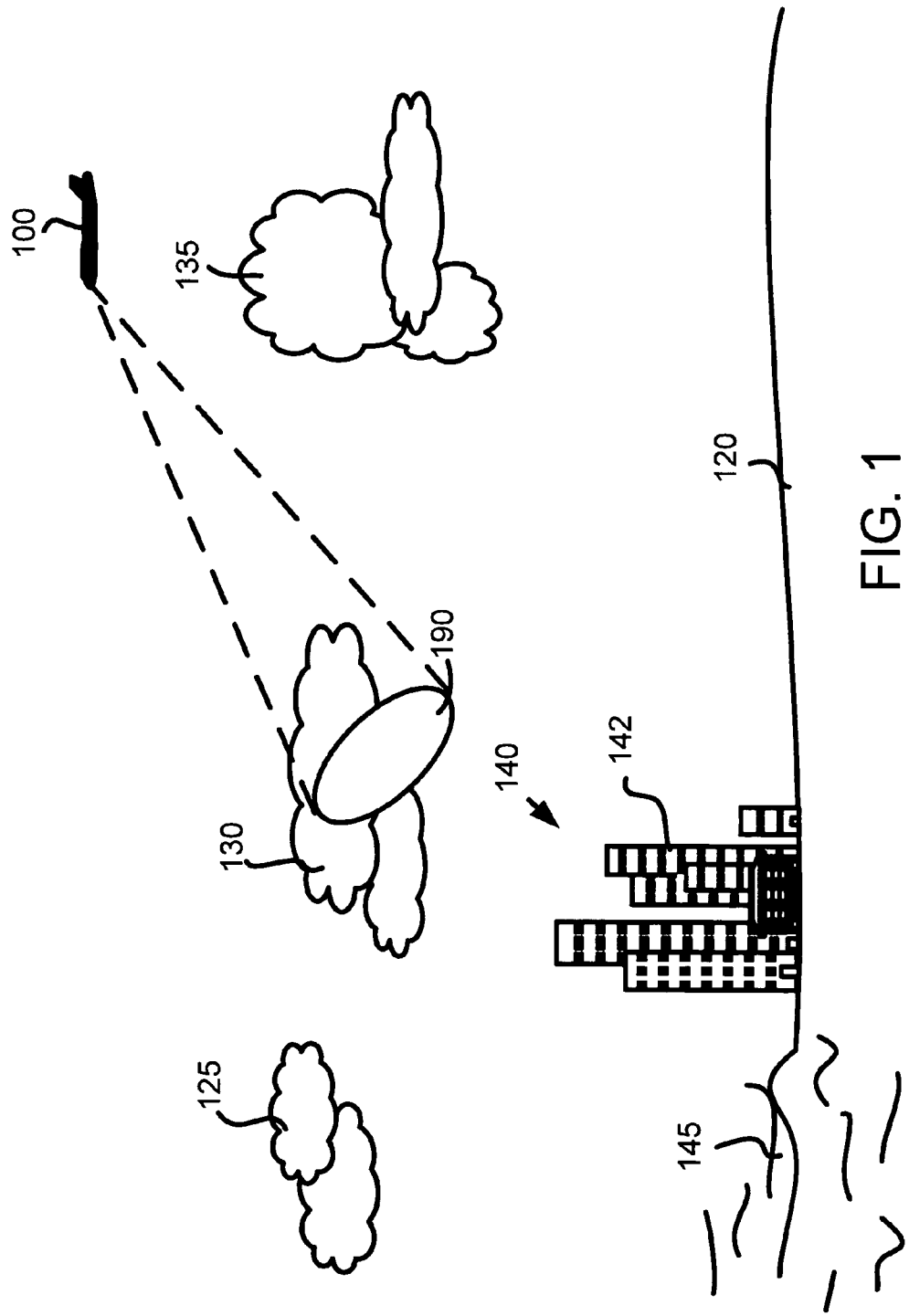
FIG. 1 is an exemplary diagram of an airplane having a weather radar system and flying in the atmosphere.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional aircraft systems, radar systems attempt to detect weather which may be a threat to the aircraft or passengers. However, in environments in which ground clutter or other ground reflectivity effects are pronounced, the radar systems may misidentify ground as threatening weather. As a result, air carriers attempt to circumvent weather systems which are nonexistent and thereby waste precious fuel and time.

Radar ground clutter suppression is hampered by local geographical phenomena. For example, cities near bodies of water and tall objects such as radio towers beyond the horizon sometimes violate the assumptions made during the design of general ground clutter suppression algorithms. The result is that ground clutter leaks through the suppression algorithms and is erroneously presented to the pilot as a weather target.

Conventional radar ground clutter suppression algorithms rely on the vertical gradient of the return signals resulting from multiple radar sweeps occurring at different beam elevations. The ground clutter suppression algorithms and beam tilt algorithms are designed to reject clutter under a wide variety of conditions. Unfortunately, some geographic phenomena may defeat the generally optimized algorithm, resulting in ground clutter being presented to the pilot as weather. This issue has been observed in many conventional systems.

The trade-off which normally occurs during design of ground clutter suppression algorithms is between ground clutter suppression and weather detection. Further increase in the radar's ability to provide accurate ground clutter suppression will result in an overall decrease in the radar's ability to perform its primary function of weather detection. Much of the observed ground clutter leakage is localized and is tied to understood phenomena. For instance, ground objects with very high reflectivity located near relatively low reflective bodies of water may defeat the conventional ground clutter suppression algorithms. The highly reflective city of Chicago located on the shore of Lake Michigan is a prime example. A general modification of the ground clutter suppression algorithm to eliminate ground clutter leakage from the Chicago point target would unacceptably decrease the radar's ability to detect weather across the entire radar display area.

Localized threshold optimization methods may be used to improve weather radar ground clutter suppression algorithms. The weather radar may contain a local terrain database which is currently used to determine optimal tilt angle. This database can also be tagged with localized clutter suppression/weather detection threshold information which can be processed to minimize the probability of ground clutter leakage over specific geographical areas. Even though the threshold over such "problem" areas can be locally tuned to favor ground clutter suppression, weather detection over such areas will actually be improved since it is impossible to accurately display weather phenomena over areas where ground clutter is actively leaking onto the display.

The position of the aircraft relative to the "problem" geographical feature can be used to qualify the use of the threshold information. The tops of tall, reflective objects such as weather towers poke above the horizon and result in ground clutter leakage. These objects are only a problem when they lie at a specific distance from the aircraft. Specific phenomena such as weather towers can be tagged as "horizon-only" problems and local optimization of clutter thresholds can occur based on their position relative to the local horizon.

Previous approaches to ground clutter suppression involved various algorithms including, but not limited to active editing of return data. Such editing is done by accessing a terrain database and identifying areas of typically higher reflectivity and removing any radar returns from that area. The key techniques, methodologies, and systems provided herein are an improvement over editing of radar returns.

Referring to FIG. 1, an aircraft 100 is depicted having a radar on-board capable of casting a radar beam 190 and receiving reflective energy from weather systems 125, 130, 135, and the like. Weather systems 125, 130, and 135 may be representative of any variety of weather systems. Convective weather system 130 may be over a city 140 having a plurality of buildings 142. City, 140 may be on the shores of a major body of water 145.

Figure 2:
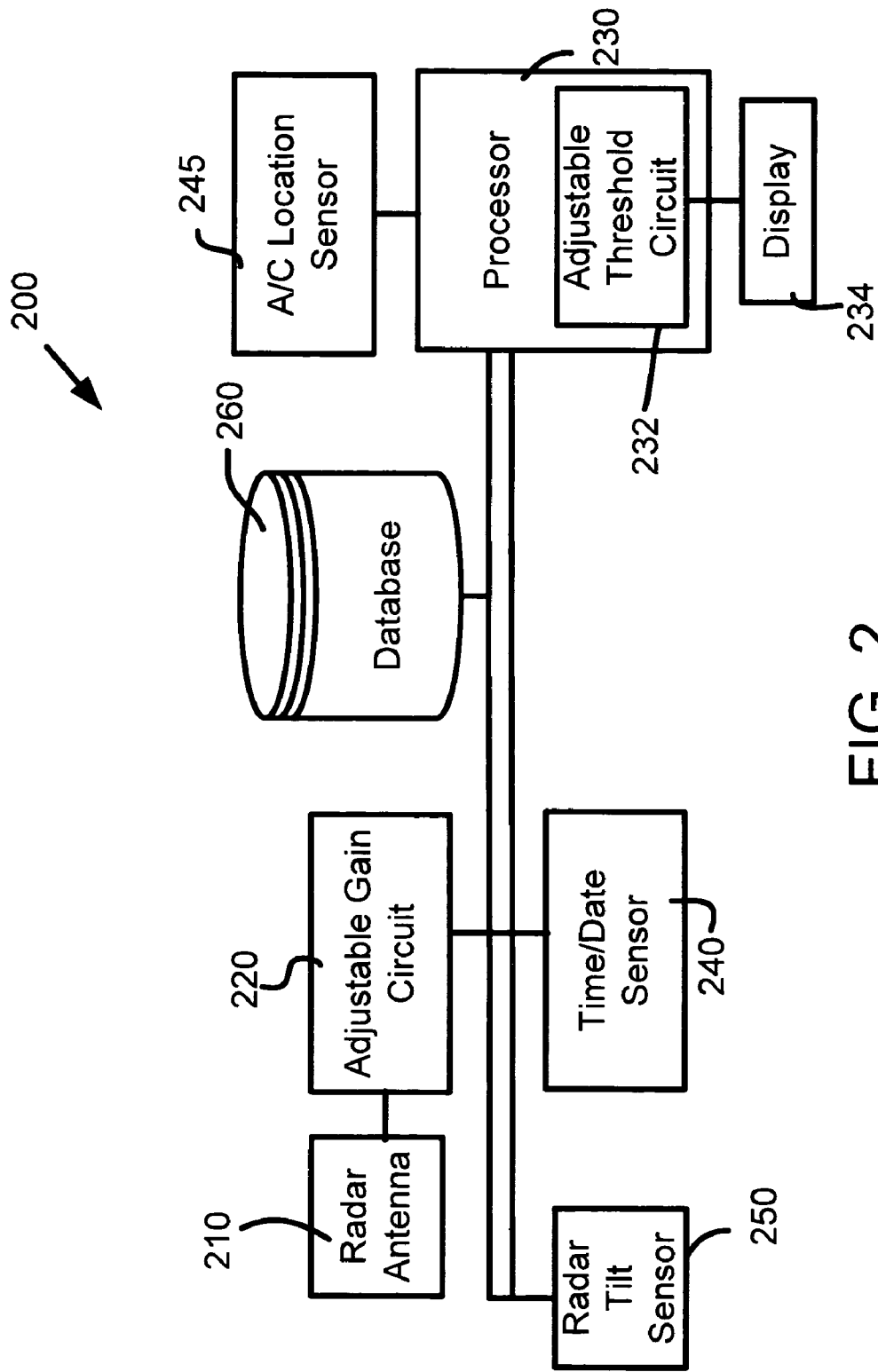
FIG. 2 is an exemplary block diagram of a radar system having an adjustable threshold circuit.

Referring now to FIG. 2, a radar system 200 includes a radar antenna 210 for sending and receiving radar signals. System 200 also includes an adjustable gain circuit 220 that is configured to change the gain of the radar signal provided to or received from radar antenna 210. Processing device 230 receives time and date data from time/date sensor 240 and radar tilt sensor 250, among other systems and sensors. Further, processing device 230 receives location data from an aircraft location sensor 245, such as but not limited to a GPS receiver. In an exemplary embodiment, processing device 230 also accesses a database 260 which contains information relating to known ground clutter locations based on the location of the aircraft. Processing device 230 may also be configured with instructions which calculate and/or determine an appropriate adjustable threshold command via a control law which is based on the location of the aircraft, the known ground clutter location, the time-of-day, the time-of-year, etc. The adjustable threshold command is to be communicated to an adjustable threshold circuit 232 based on data supplied to processing circuit 230 such as but not limited to the locations of the aircraft, locations of known ground clutter, time-of-day, time-of-year, temperature inputs, and the radar beam direction. As shown, adjustable threshold circuit 232 is running on processor 230, however adjustable threshold circuit is not limited to the depicted structure but may be running on a different processor or a dedicated circuit or processor. Further, other information such as latitude, longitude, maritime, or continental, etc. may also be used to make the gain adjustment. Database 260 may be used to describe whether a specific location (i.e., latitude, longitude) is near a known ground clutter target. The database may be generated from a table of altitudes versus latitude/longitude.

A threshold control law used in adjustable threshold circuit 232 may be based on any of a number of factors, including but not limited to the location of the aircraft, the location of ground clutter, the location of bodies of water, the time-of-day, the time-of-year, etc. The thresholds may be adjusted according to these characteristics using adjustable threshold circuit 232, and thereby display, on display 234, the appropriate weather-hazard alert or condition. Other types of alerts may also be used and be based on the adjustable thresholds, including but not limited to visual and aural warnings. In an exemplary embodiment, location, time, date, etc. may be used to predict ground reflectivity so ground clutter can be suppressed. Also, in an exemplary embodiment, location, date, time, etc. may be used to adjust thresholds to more accurately depict weather hazards.

In accordance with an exemplary embodiment, any type of weather radar that operates in a range of environments may be used. This includes, but is not limited to simple auto-tilt radars, manual radars, as well as fully automatic systems including but not limited to the WXR-2100 multiscan radar available from Rockwell Collins of Cedar Rapids, Iowa.

In an alternative embodiment, system 200 may be used to control antenna tilt, gain control on the receive side, gain control on the transmit side, as well as thresholds.

The database may be used to bias the threshold process, the gain control process, or antenna tilt. Antenna beams which impinge on known ground clutter have their effective gain reduced during sampled ranges that have that interaction. This allows known ground clutter to not be displayed to the pilot and allows increased weather detection characteristics in areas of typically high reflectivity. The gain reduction system differs from an editing system in that boundary values may be softened to reduce the effects of identification mistakes and still allow weather detection in the area influenced by land, island, or mountain targets.

In a similar manner, the thresholds used in multibeam clutter rejection processes may be modified by using the database to improve weather detection margins and improve clutter removal robustness. This may allow lower antenna beam angle to interrogate weather while providing clutter rejection for precipitous terrain.

Figure 3:
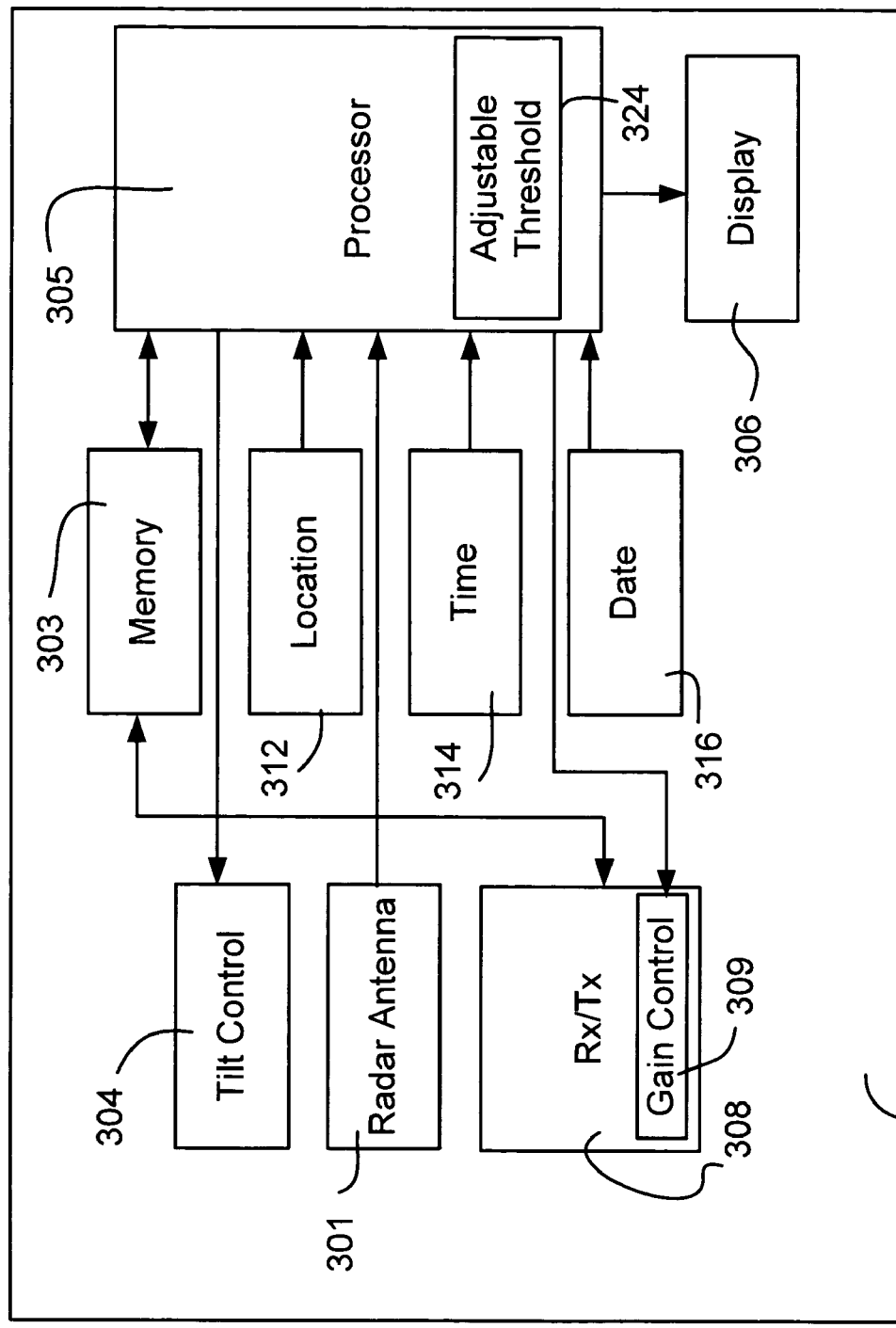
FIG. 3 is another exemplary block diagram of an airborne weather radar system capable of adjusting to time-of-day, season, and/or location.

With reference to FIG. 3, weather radar system 300 is similar to system 200 described above. System 300 may utilize any type of base hardware including the hardware associated with conventional weather radar systems manufactured by Rockwell Collins, Inc. and Honeywell International. System 300 is advantageously configured to automatically adjust to a particular location parameter, time-of-day parameter, and/or season parameter.

The location parameter can provide a precise latitude and longitude, a general area, a distance along a flight plan or other type of location indicator. The location parameter can be provided by any type of location sensor including but not limited to a GPS system. The location parameter can also be provided from an off-airplane source or be derived from flight plans and time-of-flight parameters.

System 300 preferably includes a tilt control circuit 304, a radar antenna 301, a receive transmit circuit 308, a memory 303, a location circuit 312, a clock circuit 314, a date circuit 316, a display 306, and a processor 305. Processor 305 may include a display threshold adjustment circuit 324. Circuit 324 may operate in accordance with the description provided above. Gain control circuit 309 can operate on the receive end or the transmit end. Preferably, gain control circuit 309 operates on the transmit end and is controlled by a signal from processor 305 or alternatively operates in processor 305.

Location circuit 312 provides a location parameter to processor 305. In one embodiment, the location parameter can indicate a specific geographic area in which known ground clutter targets exist by comparing the present location of the aircraft with locations of known ground clutter stored in memory 303 or a database, etc. Some specific geographic regions that have particular ground clutter characteristics include cities which are often highly reflective. In particular, large cities by large bodies of water, mountains, buildings on the horizon, and other similar features may be very highly reflective.

In an alternative embodiment, the location parameter can indicate a specific region having a predetermined target area. For example, the location parameter can be any area, but typical examples would be in the range of a several square mile region. The size and/or borders of regions can change as a function of location, time-of-day, and/or season.

Clock circuit 314 provides an indication of time-of-day to processor 305. Date circuit 316 provides a time-of-year indication to processor 305. Although shown as coupled directly to processor 305, circuits 312, 314, and 316 can be incorporated within processor 305 and can even be provided wholly or at least partially as a software sub-routine. In addition, circuits 312, 314, 316 can communicate with processor 305 through memory 303. Processor 305 does not need to communicate through memory 303 and can communicate directly with receive/transmit circuit 308.

Processor 305 can provide control signals to tilt control circuit 304 and gain control circuit 309. System 300 can be adjusted through processor 305 to take into account a location parameter from circuit 312, a time-of-day parameter from circuit 314, and a time-of-year parameter from circuit 316. Processor 305 preferably automatically adjusts at least one of display threshold circuit 324, tilt control circuit 304, and gain control circuit 309. The adjustment preferably makes the sensing of weather regions and their severity more accurate and allows more accurate removal of ground clutter. Gain control circuit 309 can control the gain associated with the transmit end or the receive end of signals provided to and from antenna 301.

Antenna controlled elevations, radar gains, weather detection thresholds, and ground clutter rejection thresholds can also be a function of time-of-year and time-of-day. As an example of time-of-year adjustments, consider the changes in ground reflectivity with changes in snow cover and grass cover, seasonal changes in forest foliation and defoliation, etc. An example of time-of-day adjustment may involve the presence of dew causing increased reflectivity during early morning, etc.

Figure 4:
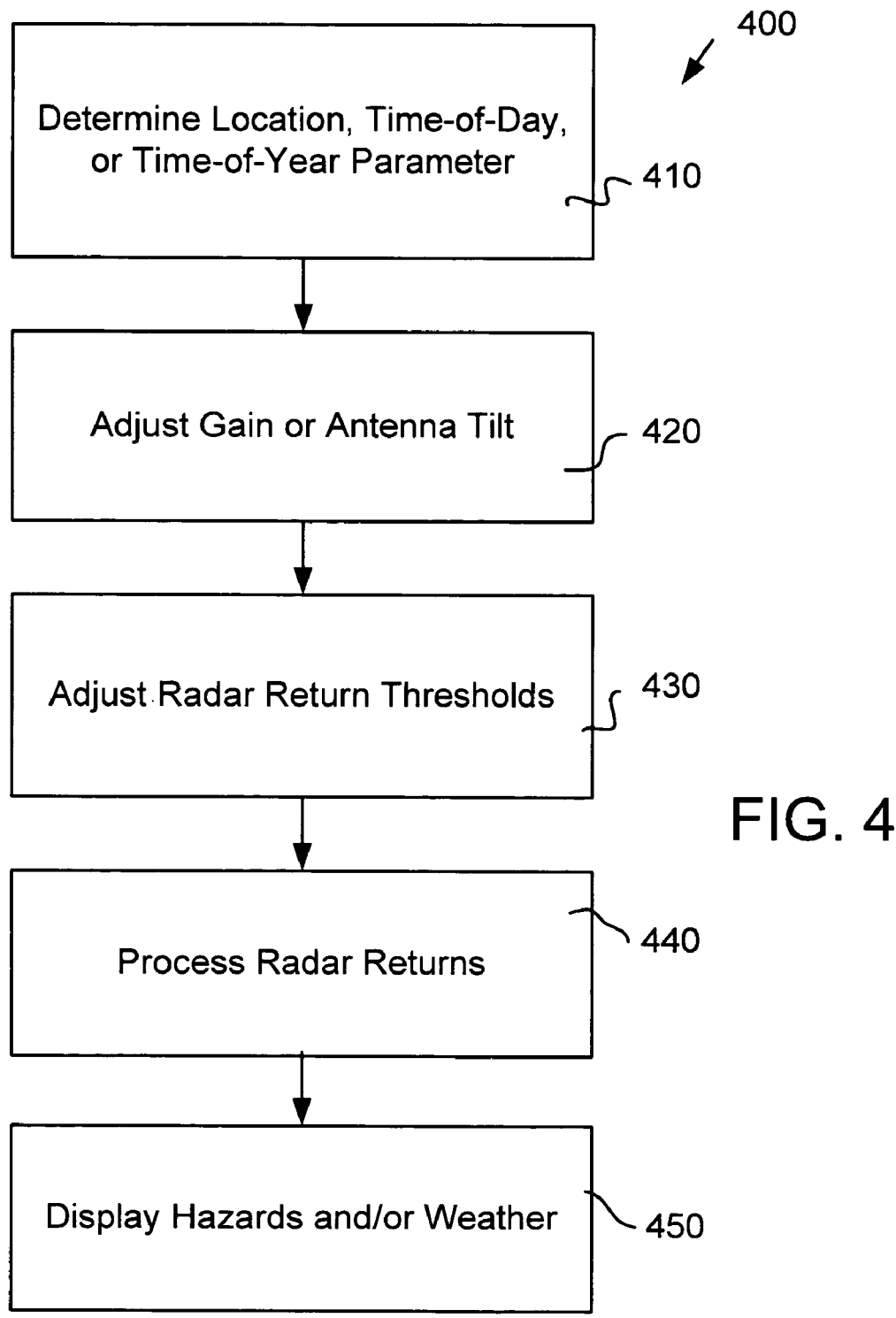
FIG. 4 is an exemplary flow diagram of the operation of the airborne weather radar system illustrated in FIG. 3 in accordance with an exemplary embodiment.

With reference to FIG. 4, a flow diagram 400 depicts the operation of circuit 300. Processor 305 preferably operates software to implement flow diagram 400. A location parameter, time-of-day parameter, and/or seasonal parameter is determined (process 410). The antenna tilt is then adjusted in accordance with the parameter or the gain is adjusted in accordance with the parameter (process 420). Radar return thresholds, display thresholds, and/or ground clutter rejection thresholds may also be adjusted based on the parameters to support the ground clutter rejection (process 430) and to optimize weather detection. Processor 305 processes radar returns (process 440). Processor 305 then provides indications of hazards and/or weather on display 306 (process 450).

Figure 5:
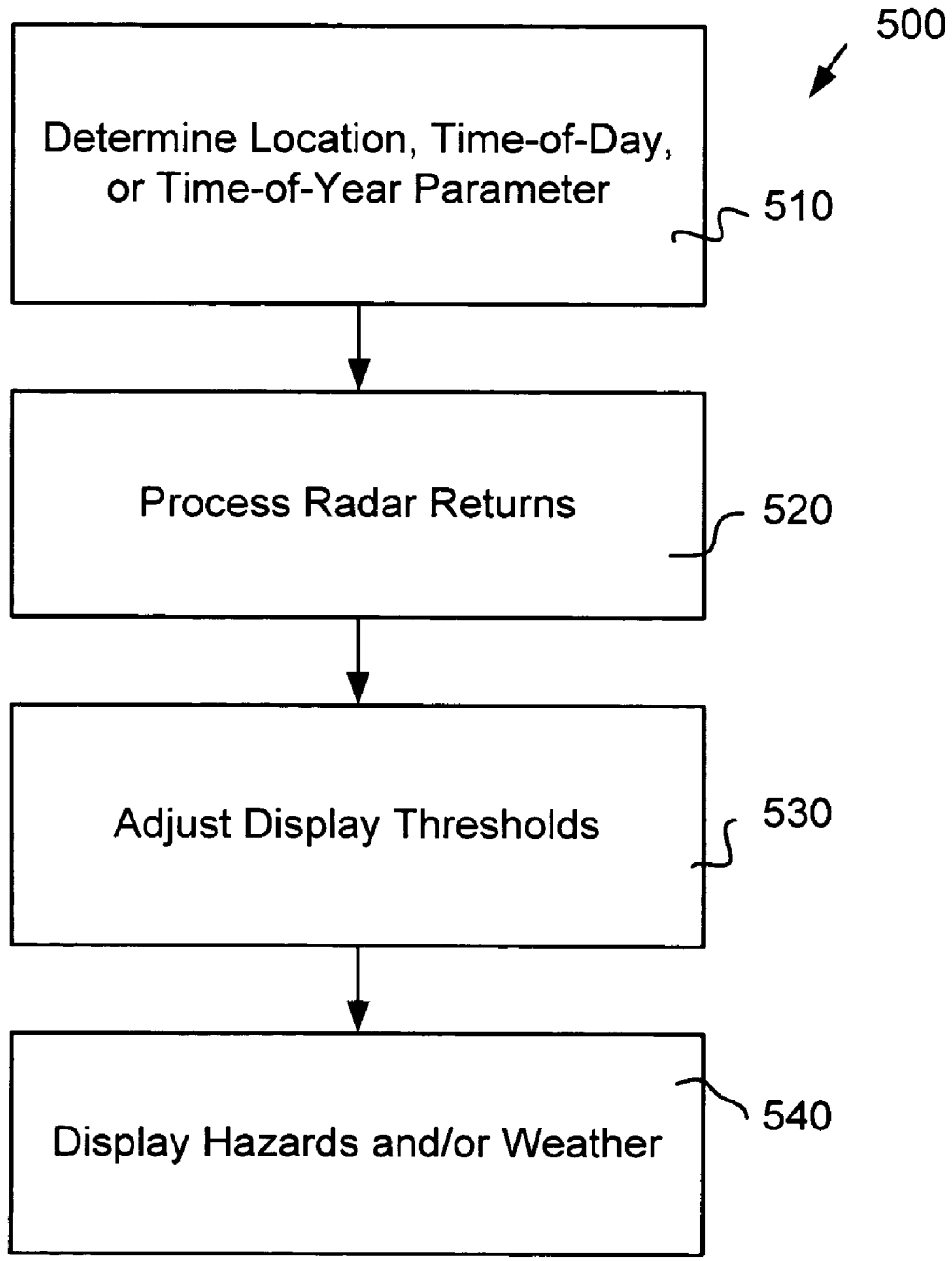
FIG. 5 is an exemplary flow diagram of the operation of the airborne weather radar system illustrated in FIG. 3 in accordance with yet another exemplary embodiment.

With reference to FIG. 5, a flow diagram 500 depicts operation of system 300 in accordance with another embodiment. Processor 305 preferably operates software to implement flow diagram 500. A location parameter, time-of-day parameter, or seasonal parameter is determined (process 510). Radar returns are processed in processor 305 (process 520). The threshold associated with the display of hazards or weather is adjusted (process 530). Indications of hazards and/or weather are then displayed on display 306 (process 540). Thresholds may be adjusted on a complete radar sample environment or on a radar resolution cell by radar resolution cell basis. In one embodiment, thresholds preferably slew smoothly from space/time region to space/time region with step changes preferably not being allowed.

Figure 6:
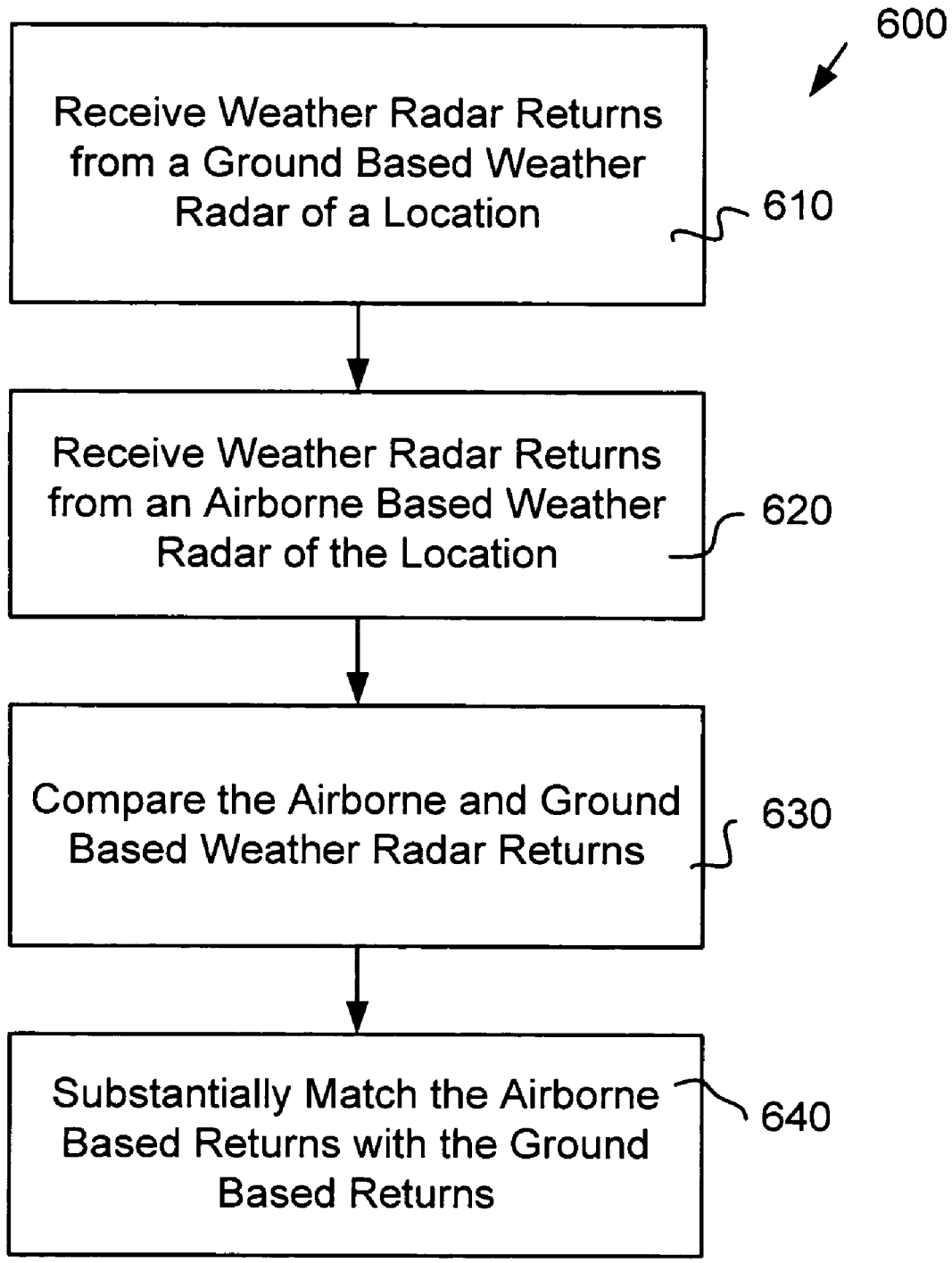
FIG. 6 is an exemplary flow diagram of an airborne weather radar system using ground based returns in accordance with still another exemplary embodiment.

Referring now to FIG. 6, a method 600 of creating a weather radar display threshold database comprises receiving weather radar returns from ground-based weather radar from a location (process 610). The method also comprises receiving weather radar returns from an airborne based weather radar over a location (process 620). Once the weather radar returns have been received, a comparison may be made of the airborne and ground based weather radar returns (process 630). Once this comparison is accomplished a substantial match of the airborne based returns and the ground-based returns may be made by providing display thresholds (process 640). In accordance with other exemplary embodiments, a plurality of learning systems may be applied in order to determine the display thresholds needed to achieve, in an optimal manner, the matching airborne based weather radar returns being displayed.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of detecting weather on an aircraft using a weather radar system, the method comprising:
   determining a location of a reflective radar target;
   accessing a database having stored information relating to ground clutter associated with the location of the reflective radar target;
   retrieving weather radar information associated with the location; and
   automatically adjusting the weather radar return threshold in response to the information.

2. The method of claim 1, wherein determining a location further comprises: receiving global positioning system (GPS) signals.

3. The method of claim 1, wherein the stored information is stored in a ground clutter database.

4. The method of claim 1, wherein the stored information is stored in a database comprising at least one of ground clutter rejection thresholds or ground clutter reflectivity information.

5. The method of claim 1, wherein the stored information includes at least one of location-based information, time-of-day based information, or seasonal information.

6. The method of claim 1, wherein automatically adjusting includes:
   at least one of applying a threshold control law to adjust a threshold for a weather radar display associated with the weather radar system, adjusting a weather radar signal gain, adjusting a tilt angle of a weather radar antenna, or adjusting a ground clutter suppression threshold in order to suppress ground clutter.

7. The method of claim 1, further comprising:
   determining a type for the reflective radar target.

8. The method of claim 7, wherein the type comprises any geographical terrain.

9. The method of claim 1, further comprising:
   generating a weighting factor based on the location, time of day, time of year, the weighting factor being representative of the reflectivity of the target.

10. A method of adapting an aircraft weather radar system, the method comprising:
    determining at least one of a time-of-year parameter, a time-of-day parameter, or a location parameter; and
    automatically adjusting the weather radar system radar return display thresholds to display weather in response to at least one of the time-of-year parameter, time-of-day parameter, or location parameter in order to at least one of suppress ground clutter or to more accurately depict weather hazards.

11. The method of claim 10, wherein the location parameter is derived from global positioning system (GPS) signals.

12. The method of claim 10, wherein the location parameter comprises information relating to known ground clutter targets.

13. The method of claim 10, wherein the adjusting occurs in response to the location parameter and the time-of-year parameter or the location parameter and the time-of-day parameter or the time-of-year parameter and the time-of-day parameter.

14. The method of claim 10, further comprising:
    adjusting a tilt angle, or a gain.

15. The method of claim 10, further comprising:
    applying a threshold control law to adjust the weather radar system.

16. An airborne weather radar system carried on an aircraft, comprising:
    a radar antenna system; and a processing means for automatically adjusting display thresholds of the weather radar system based on at least a location of known ground clutter targets to display weather and aid suppressing ground clutter.

17. The airborne weather radar of claim 16, wherein the processing system changes a display threshold for a weather radar display using a threshold control law.

18. The airborne weather radar of claim 16, wherein the processing means adjusts the performance in response to at least one of the location, the time-of-day or the time-of-year.

19. The airborne weather radar of claim 16, wherein the system further comprises a display coupled to the processor.

20. A method of creating a weather radar display threshold database, comprising:
- receiving by a ground based weather radar system weather radar returns from a location;
- receiving by an airborne based radar system weather radar returns over the location;
- determining a display threshold for the airborne based weather radar system which provides a substantial match of the ground based weather radar returns and the airborne based weather radar returns.

* * * * *